United States Patent
Ahern et al.

(10) Patent No.: US 11,170,986 B2
(45) Date of Patent: Nov. 9, 2021

(54) LUMINESCENCE BASED FIBER OPTIC PROBE FOR THE DETECTION OF RARE EARTH ELEMENTS

(71) Applicant: United States Department of Energy, Washington, DC (US)

(72) Inventors: John C Ahern, Pittsburgh, PA (US); Paul R Ohodnicki, Jr., Allison Park, PA (US); John P Baltrus, Jefferson Hills, PA (US); Jacob Lorenzi Poole, Pittsburgh, PA (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 15/785,634

(22) Filed: Oct. 17, 2017

(65) Prior Publication Data

US 2019/0115199 A1 Apr. 18, 2019

(51) Int. Cl.
| | |
|---|---|
| *G01J 3/02* | (2006.01) |
| *H01J 49/04* | (2006.01) |
| *G01J 3/12* | (2006.01) |
| *G01N 21/64* | (2006.01) |
| *G01N 21/85* | (2006.01) |
| *G01J 3/44* | (2006.01) |

(52) U.S. Cl.
CPC ......... *H01J 49/0459* (2013.01); *G01J 3/0218* (2013.01); *G01J 3/0237* (2013.01); *G01J 3/12* (2013.01); *G01N 21/6428* (2013.01); *G01J 3/4406* (2013.01); *G01J 2003/1213* (2013.01); *G01N 2021/6484* (2013.01); *G01N 2021/8528* (2013.01); *G01N 2201/062* (2013.01)

(58) Field of Classification Search
CPC ......... G01N 21/645; G01N 2021/6484; G01N 21/3577; G01N 21/33; G01N 2021/772; G01J 3/0218
See application file for complete search history.

(56) References Cited

U.S. PATENT DOCUMENTS

| | | | | |
|---|---|---|---|---|
| 4,861,727 | A * | 8/1989 | Hauenstein | A61B 5/1459 436/136 |
| 6,636,652 | B1 * | 10/2003 | Kopelman | B82Y 15/00 385/12 |
| 2003/0129092 | A1 * | 7/2003 | Murray | B01J 20/268 422/82.07 |

(Continued)

*Primary Examiner* — Kenneth J Malkowski
(74) *Attorney, Agent, or Firm* — Timothy L. Harney; Aaron R. Keith; Michael J. Dobbs

(57) ABSTRACT

The disclosure relates to an apparatus, method and process for detecting rare earth elements. The system includes an LED powered by a first power source and a focusing lens in optical communication with the LED. A shortpass filter is in optical communication with the focusing lens; and a fiber bifurcated cable in optical communication with the shortpass filter. The system includes a probe tip in optical communication with the fiber bifurcated cable and a sample; a first aspheric lens in optical communication with the fiber bifurcated cable. A longpass filter is in optical communication with the first aspheric lens and a second aspheric lens in optical communication with the longpass filter. The system includes a spectrometer connected to a power source, where the spectrometer is in optical communication with the second aspheric lens.

20 Claims, 7 Drawing Sheets

(56) References Cited

U.S. PATENT DOCUMENTS

| | | | | |
|---|---|---|---|---|
| 2010/0294948 A1* | 11/2010 | Fukuzawa | ............ | G01N 21/645 |
| | | | | 250/458.1 |
| 2010/0309454 A1* | 12/2010 | Zhang | ....................... | G01J 3/02 |
| | | | | 356/39 |
| 2012/0056093 A1* | 3/2012 | Poteet | ....................... | G01J 3/02 |
| | | | | 250/362 |
| 2013/0122266 A1* | 5/2013 | Kane | .................... | C09K 11/778 |
| | | | | 428/195.1 |

\* cited by examiner

LUMINESCENCE BASED FIBER OPTIC PROBE FOR THE DETECTION OF RARE EARTH ELEMENTS

GOVERNMENT INTERESTS

The United States Government has rights in this invention pursuant to the employer-employee relationship of the Government to the inventors as U.S. Department of Energy employees and to site-support contractors at the National Energy Technology Laboratory.

RELATION TO OTHER APPLICATIONS

This application claims priority to and the benefit of U.S. Provisional Patent Application No. 62/365,113 filed Jul. 21, 2016 which is hereby incorporated by reference in its entirety.

FIELD OF THE INVENTION

One or more embodiments relates to detecting rare earth elements (REEs). More specifically, embodiments relate to a system, method and process that detects low concentrations of REEs in process streams.

BACKGROUND

The control of the world's operating rare earth element (REE) mines is heavily consolidated, thereby creating market insecurities and necessitating the diversification of REE supply chains. REEs are critical for many modern devices from cell phones to automobiles.

Potential supply chain disruptions therefore pose a substantial threat to resources and economic security. As one way to address this challenge, researchers are investigating ways to recycle REEs from process streams. Conventional means for testing generally involve sending samples back to a laboratory for inductively-coupled mass spectrometry (ICP-MS) analysis and waiting weeks for results.

More expensive table-top systems including a Fluorolog 3 or an ICP-based system are not portable. Significant opportunities exist to further enhance the low limit detection of REEs through optimization of the optical components as well as engineering of sensitizers. For example, one challenge stems purely from the availability of components such as high-powered LEDs in a wide range of bandwidths to optimize the excitation wavelengths that would allow further improvements while maintaining portability.

These and other objects, aspects, and advantages of the present disclosure will become better understood with reference to the accompanying description and claims.

SUMMARY

Embodiments relate to a method for extraction of REEs from coal byproduct and other process streams originating from, for example, metallurgical plants, power plants, and gasification plants, amongst others.

Embodiments allow for rapid detection and analysis and are portable, providing immediate results crucial for cost-management in the recovery process. This is a major improvement over conventional means of testing, which generally involve sending samples back to a laboratory for ICP-MS analysis and waiting weeks for results. This time savings is easily translated into monetary savings when considering the cost of inactivity in large-scale recovery operations.

Embodiments may be carried into the field allowing for rapid detection of high-value ores or process streams for recovery. Significant opportunities also exist to further enhance the low limit of detection through optimization of the optical components as well as engineering of sensitizers either in the solution to be interrogated or immobilized on the probe tip. For example, one challenge stems purely from the availability of components such as high-powered LEDs in a wide range of bandwidths to optimize the excitation wavelengths that would allow further improvements while maintaining portability. Additional directions may include using disposable probe tips so there is no need to clean the ends of bifurcated cable. Sorbents could also be incorporated into a coating on the probe tip to better hold the REEs close to the probe, and other such functional coatings can also be envisioned. Plasmonic nanoparticles may also be used alone or in conjunction with the other sensitizers to enhance the rare earth signal. Software may also be written to automatically identify the sample identity and concentration based on libraries of data taken on similar types of samples.

One embodiment relates to an apparatus for detection of rare earth elements without any sensitizers or other signal boosting compounds in solution or immobilized on a probe tip. The apparatus includes an LED light source connected to a power source providing a broad bandwidth of light and a shortpass filter in optical communication with the LED light source. The shortpass filter reduces low energy emissions from the LED source. The shortpass filter is in optical communication with the 9-fiber arm of a Y-shaped 19-fiber bifurcated cable. Light passes through this arm into the unified 19-fiber end of the Y-shaped bifurcated cable. This unified end can act as the probe tip that gets dipped into the sample. Light is able to pass back up the bifurcated cable including passing through the 10-fiber arm. This 10-fiber arm of the Y-shaped bifurcated cable is in optical communication with an aspheric lens followed by a longpass filter. The aspheric lens helps focus the light from the cable into the filter. The longpass filter acts to reduce the high-energy signal from the LED light source. The longpass filter is in optical communication with a second aspheric lens followed by the spectrometer which analyzes the one or more luminescent signals.

Another embodiment relates to an apparatus for detection of rare earth elements with sensitizers dissolved in solution with the rare earth element(s) of interest. This embodiment is differentiated from the previous embodiment because sensitizers such as silver dicyanoargentate ($Ag(CN)_2$) are dissolved in solution with the rare earth elements. These sensitizers complex with the rare earth elements and allow for increased luminescent signal for the rare earth, thereby lowering its limit of detection.

Yet another embodiment relates to an apparatus for detection of rare earth elements with sensitizers immobilized in a sol-gel coated on a probe tip. This embodiment is differentiated from the previous two embodiments because sensitizers such as silver dicyanoargentate are immobilized in a silica-based sol-gel. The sol-gel is then dip-coated on a stripped end of fiber that was connected to the end of the bifurcated cable that would have gone into the solution with the rare earth elements. The rare earth elements in solution will migrate through the semi-porous sol-gel and complex with the sensitizers immobilized within. Immobilizing the sensitizers on a fiber tip simplifies field prep of samples, since there is no need to measure out the amount of sensitizer needed, tips can be disposed after use and there is no need to contaminate the sample with the sensitizers. This embodiment also theoretically cuts down on the amount of sensitizer required since the sensitizers are more concentrated near the probe tip.

The novel process and principles of operation are further discussed in the following description

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide differentiation from existing technologies.

At least one embodiment is based on the luminescence detection of certain rare earth elements. Rare earth elements may be excited directly, however, direct excitation is difficult due to the heavy shielding of the f-orbitals of the lanthanides. It is well known that the presence of particular additives (termed sensitizers) may dramatically enhance their excitation. After photoexcitation, the excited electrons relax to lower energy states emitting light with characteristic frequencies. Sensitizers including 2,2 bipyridine or $[M(CN)_2]_3^{3-}$ (where M=Cu, Ag, Au or a combination thereof) are chosen for their ability to transfer energy to rare earth ions due to the existence of a strong absorption band in the sensitizer and a substantial overlap of this absorption band with the excitation band of the rare earths.

This process is known as Dexter energy transfer (local bond interactions using organic sensitizers) or Förster energy transfer (long-range through-space M-Ln interactions using the $M(CN)_2$ sensitizers) and allows for increased luminescent signal from the rare earth because it is more efficient than directly exciting electrons in the heavily shielded f-orbitals of the rare earth ions. The increased luminescent signal allows for lower limits of detection for the rare earth elements. This sensitized luminescence method adapted for field use is a novel means of screening coal by-product and other process streams to identify streams with high concentrations of rare earth ions, which is much more cost-effective for separation and recovery than conventional methods. The primary advantages of this system are its fast turnaround of results, portability and cost per sample. Embodiments can deliver results in the field orders of magnitude faster than sending samples to a lab. Also, it currently costs approximately a tenth of an ICP-MS system and does not require extensive operator expertise, maintenance or high amounts of consumables.

Figure 1:
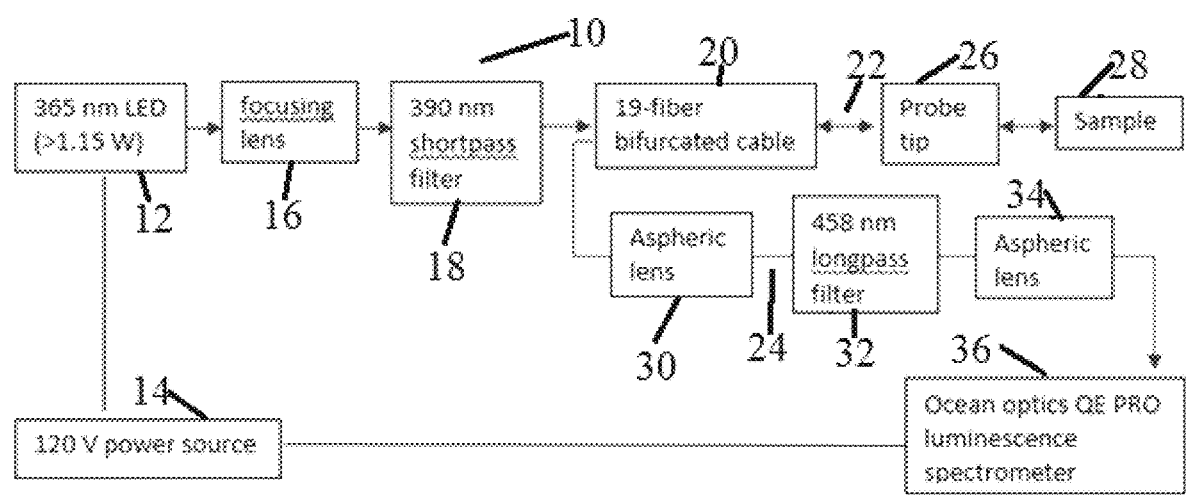
FIG. 1 illustrates a schematic diagram of the embodiments of invention.

FIG. 1 illustrates a methodology for detecting and quantifying REEs using a portable fiber optic-based probe configuration. One embodiment of the sensor system (10) includes a light source (12) coupled to a power source (14). In at least one embodiment, the power source (12) is a 365 nm LED (1.15 W minimum/1.4 W typical output) from Thorlabs, for example, while the power source (14) is a 120 V power source.

The light source (12) is used to photoexcite the sample, such as, trivalent rare earth ions in an aqueous solution with or without sensitizers present. It should be appreciated that there are coupling losses at each connection so the actual amount of light reaching the sample may be somewhat less than 1.4 W. A lens (16), a Thorlabs LA4052 lens for example, is used to focus the light generated from the light source (12) into a shortpass filter (18), a 390 nm shortpass filter, to reduce the low energy emissions from light source (12) which would otherwise raise the background signal.

The light then is passed through a fiber bundle (20), a 9-fiber arm, a mapped 19-200 µm 0.22 NA fiber bifurcated cable bundle for example. In at least one embodiment, the fiber bundle (20) has two arms, one arm (22) with 9 fibers mapped to one end and another arm (24) with 10 fibers; the two fiber bundles (22, 24) are connected as a single arm at the opposite end to form a Y shape as seen in FIG. 1. After passing through the 9-fiber arm (22) the UV light is directed through the 19-bundled end (coupled to a probe tip (26)) immersed in a sample (28), a solution with rare earth nitrates with or without sensitizers in it. The luminescent signals from the rare earths in sample (28) are collected and passed back through the bifurcated cable to the 10-fiber arm (24) connected to an Ocean Optics QE PRO luminescence spectrometer (36) where it is analyzed using Oceanview software for example.

The effective separation of UV light generated by the light source (12) and visible luminescence from the sample of these mapped fibers (20) allows this system (10) to provide a much higher signal to noise ratio than other known fiber couplers. The exciting light from the light source (12) may be used to excite rare earth elements either directly or with the help of sensitizers. Standard silica optical fibers are known to be strongly affected by UV light, degrading their performance over time. This hurdle was overcome by the use of solarization-resistant optical fiber rated for continuous operation with high optical powers of 365 nm light. After leaving the 10-fiber arm of the cable (24) the light is collimated using an aspheric lens (30), a Thorlabs C220TME-A aspheric lens, prior to passing through a longpass filter (32), a 458 nm longpass filter, and then another aspheric lens (34) to re-focus the light into the spectrometer (36). All fiber connections are SMA 905. The overall power consumption of the device is quite low, thereby facilitating its operation with portable sources such as a battery or solar cell array, for example a battery or solar cell array. In at least one embodiment system (10) is housed in a box that completely obscures ambient light.

Figures 2A, 2B, 2C:
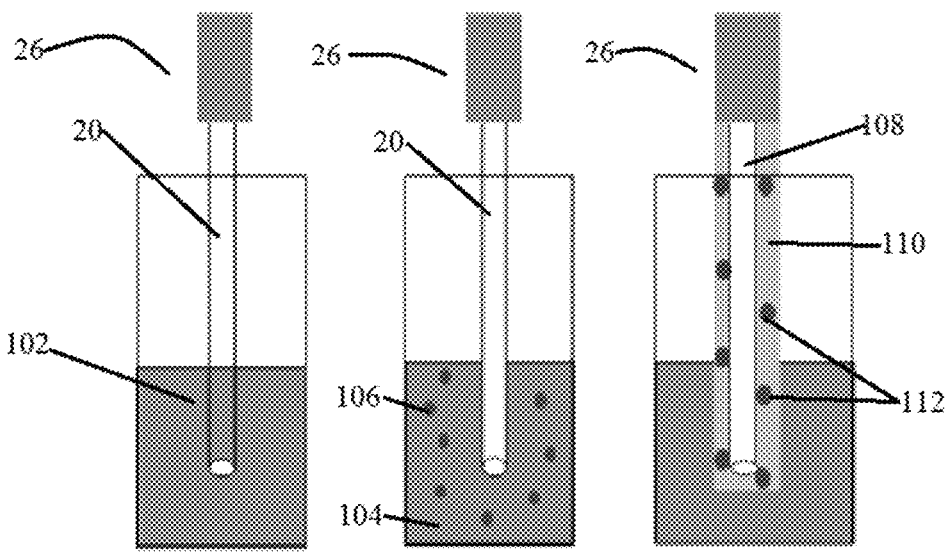
FIGS. 2A-2C illustrate different probe tips in solution, where the embodiment of FIG. 2A is just the probe tip in a solution with rare earth elements and no sensitizers; the embodiment of FIG. 2B is the same as embodiment A, except sensitizers (pictured as dots) are dissolved in solution; the Embodiment of FIG. 2C has a disposable fiber tip that has been stripped and dip-coated in a functional coating such as, for example, a silica sol-gel (outer-layer on probe) that has sensitizers (dots) immobilized within it.

FIGS. 2A-2C illustrates three alternative embodiments of the probe tip (26). The embodiment illustrated in FIG. 2A illustrates the fiber bifurcated cable (20) dipped directly into an aqueous solution (102) with rare earth elements dissolved in it. The embodiment illustrated in FIG. 2B illustrates the fiber bifurcated cable 20 dipped into a solution (104) with sensitizers (106) such as silver dicyanoargentate dissolved therein. These sensitizers (106) complex with the rare earth elements and can increase their luminescent signal via energy transfer. The embodiment illustrated in FIG. 2C illustrates a disposable fiber (108) that is in optical communication with the fiber bifurcated cable 20. This disposable fiber tip (108) has been stripped and dip-coated with a silica sol-gel (110) that has sensitizers (112) immobilized within it. This negates the need to measure out sensitizers in the field and theoretically uses less sensitizers since they are concentrated near the probe tip where the signal is generated and collected.

The detection capability of the proposed sensor system (12) was tested with solutions of $Ln(NO_3)_3 \cdot nH_2O$ (where Ln=Tb, Eu, Dy or Sm) in deionized water with and without sensitizers. The employed sensitizers included $KM(CN)_2 \cdot 3H_2O$ where M=Au, Ag, Cu, as well as combinations of any two of those same sensitizers. Furthermore, an organic sensitizer 2,2 bipyridine was also tested to examine its energy transfer capability. All reagents were sourced from Sigma Aldrich except for $KCu(CN)_2 \cdot 3H_2O$ which was synthesized by slow evaporation of KCN with CuCN in deionized water.

All samples were tested in 35 ml amber vials with black tape coating the outside to reduce scattering and ambient light that could otherwise overshadow the sample signal. An initial blank scan was run for the system (12) in complete darkness without turning on the lamp. This allowed for a dark current signal to be collected and later subtracted from the sample signal. The intensity of the light source (12) was accounted for by taking water blank scans in the same vial by immersing the probe tip in deionized water, sealing the sample chamber from ambient light, turning on the light source (12) and running a series of 3 scans each with an integration time of 60 seconds. In sensitized samples the blank scans were acquired with the sensitizers in distilled water. The scans were averaged and the LED intensity was calculated by taking the area under the Raman water scattering peak. This value would serve as a measure of lamp intensity for that day unless the lamp was turned off for more than 1 hour. The sample scans would then be normalized to the intensity of that Raman peak. After the acquisition of the baseline scans, the DI water was replaced with sample solutions. By this method, the signal from the REEs could be separated from the background. Calibration curves were used to determine the limits of detection (LODs). These derived LODs were evaluated based on the practical ability to distinguish sample signals from the background in the low concentration scans.

The results using the compact, bifurcated cable/ocean optics based system (10) illustrated in FIG. 1 were compared to the large and expensive Fluorolog 3 system with tunable excitation from a xenon arc lamp and quartz cuvettes. The Fluorolog system is the industry standard for solution phase luminescence measurements.

Figure 3:
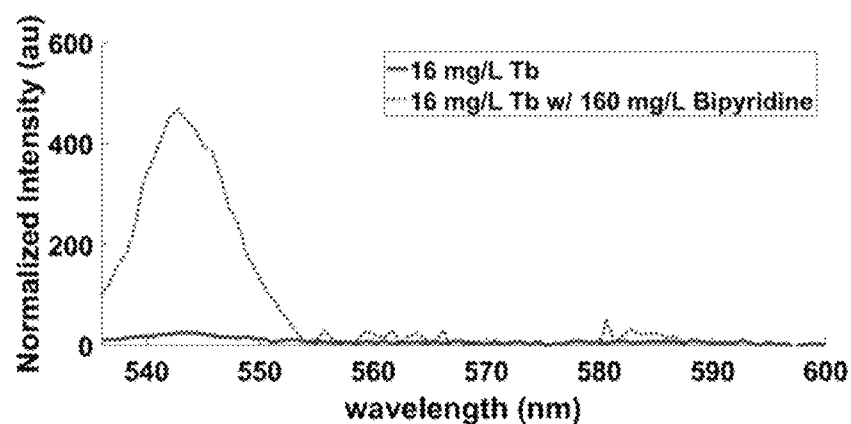
FIG. 3 illustrates luminescence emission spectra for aqueous solutions of 16 mg/L terbium nitrate pentahydrate without 160 mg/L bipyridine sensitizer using embodiments of the present invention.
Figure 4:
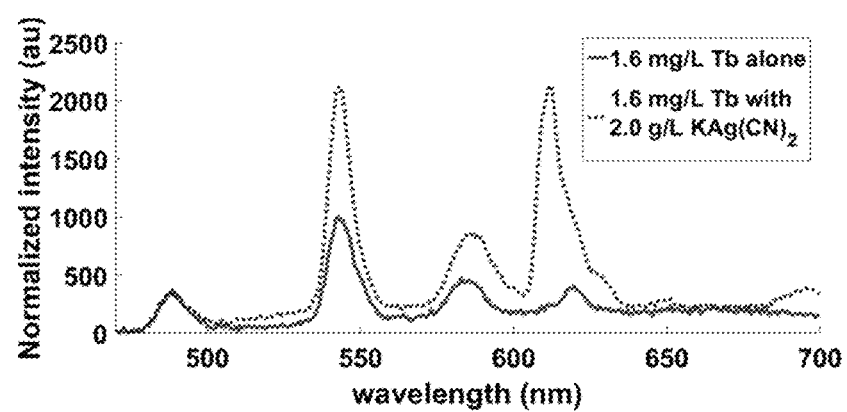
FIG. 4 illustrates luminescence spectra of 1.6 mg/L $Tb^{3+}$ in deionized water with and without 2.0 g/L $KAg(CN)_2$ sensitizer using embodiments of the present invention.
Figure 5:
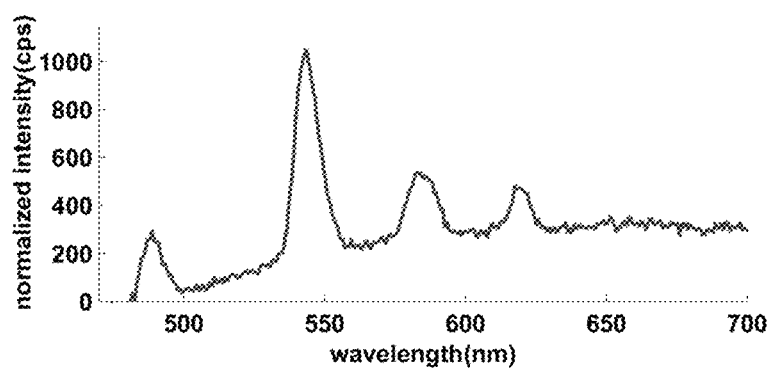
FIG. 5 illustrate luminescence spectra for 0.380 mg/L $Tb^{3+}$ in deionized water with 2.0 g/L $KAg(CN)_2$ sensitizer using embodiments of the present invention.

FIGS. 3, 4 and 5 illustrate that the chosen sensitizers may increase the luminescence signal of a rare earth ion. FIG. 3 illustrates the luminescence emission spectra for aqueous solutions of 16 mg/L terbium nitrate pentahydrate without 160 mg/L bipyridine sensitizer using the compact system. The traces are the average of three scans each with a 60 second integration time. Water and sensitizer signals have been subtracted. The metal cyanides increase the signal by a factor of 2-5 depending on the lanthanide.

The lower signal enhancement is expected since the excitation source is fixed and therefore has varying overlapping regions with the different rare earth excitation energies. If a tunable source or series of fixed sources are used, a theoretical enhancement factor of 10 should be possible. The 2,2 bipyridine has a similar enhancement factor for rare earth signal. However, the 2,2 bipyridine is known to bind with competing ions like $Fe^{2+}$, whereas, the metal cyanides are theoretically more selective because $Ln^{3+}$ ions are known to form complexes with the $M(CN)_2$ compounds (where M=Ag, Au, Cu), but, $Fe^{2-}$ or $Fe^{3+}$ do not because the formation of ferricyanide is favored instead. FIG. 4 illustrates luminescence spectra of 1.6 mg/L $Tb^{3+}$ in deionized water with and without 2.0 g/L $KAg(CN)_2$ sensitizer. FIG. 5 illustrates luminescence spectra for 0.380 mg/L $Tb^{3+}$ in deionized water with 2.0 g/L $KAg(CN)_2$ sensitizer. Terbium alone cannot be observed at this level so only the sensitized trace is reported.

TABLE 1 illustrates the detection limits for the rare-earths with and without $Ag(CN)_2$ sensitizer. A sensitized-system (10) embodiment described in this particular work was able to detect terbium and europium to nearly 100 μg/L (100 parts per billion) and dysprosium and samarium down to low mg/L (parts per million). The detection limits using $Ag(CN)_2$ or $Cu(CN)_2$ sensitizers go down to 100 μg/L for terbium and europium and hundreds of parts per billion for samarium and dysprosium. The sensitizers offer a 2-5 fold decrease in limit of detection depending on the rare-earth element. An LED tuned to approximately 400 nm could provide lower limits of detection for dysprosium and samarium since their ideal excitation wavelengths are around 400 nm based on studies with the Fluorolog system. The high μg/L (ppb) detection limits using the compact mobile system are considerably higher than the low μg/L limits of the Fluorolog or ng/L (part per trillion) limits for ICP. However, the portable system (10) can act as a screening tool for real-time measurement in coal byproducts and other industrial process streams allowing for timely decision making thereby saving the large cost of inaction in commercial scale recovery operations. The described device also has lower limits of detection than other mobile methods like XRF which have limits of detection (LODs) in the high mg/L—percent scale.

TABLE 1

|    | LOD un-sensitized (mg/L) | LOD sensitized (mg/L) |
| --- | --- | --- |
| Sm | 15 | 3.8 |
| Eu | 0.19 | ~0.050* |
| Tb | 0.37 | 0.079 |
| Dy | 8.1 | 2.0 |

*The Ag-sensitized Eu LOD can be assumed to be similar to the sensitized Tb LOD given they have the same ideal excitation energy of 369 nm and the unsensitized Eu and Tb have similar results.

Figure 6A:
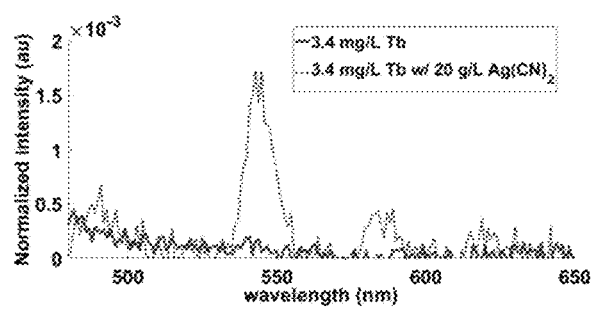
FIG. 6A depicts a graph illustrating luminescence intensity of 3.4 mg/L $Tb(NO_3)_3$
Figure 6B:
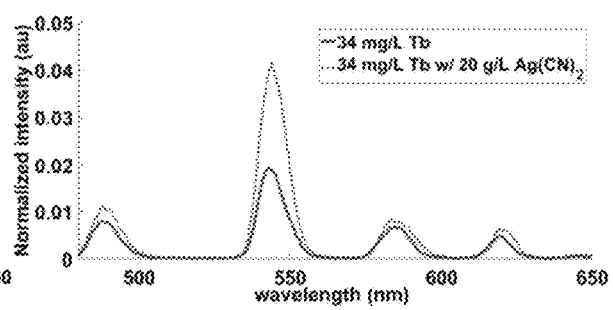
FIG. 6B depicts a graph illustrating luminescence of 34 mg/L $Tb(NO_3)_3$ (right) aqueous solutions with and without $Ag(CN)_2$ sensitizer.

FIG. 5 shows how the concentration of the lanthanide effects the degree of sensitization, where the sensitization is greatest at low industrially/environmentally relevant concentrations. FIG. 6A depicts a graph illustrating luminescence intensity of 3.4 mg/L $Tb(NO_3)_3$ (left) and FIG. 6B depicts a graph illustrating luminescence of 34 mg/L $Tb(NO_3)_3$ (right) aqueous solutions with and without $Ag(CN)_2$ sensitizer. Results were collected using a Jobin Yvon Fluorolog 3 and xenon arc lamp exciting at 369 nm through a quartz cuvette. These observations are attributed to a phenomena called aggregation-caused quenching, where the rare-earth-sensitizer compound formed results in close distances between neighboring rare earths. These close distances allow for non-radiative interactions that reduce the luminescent signal from the rare earth. Above a certain threshold (~1.0 g/L REE), the effect of aggregation caused quenching outweighs the amount of energy transfer boosting the rare earth signal. The choice of sensitizer was tested in a similar fashion. Closed-shell $d^{10}$ metal cyanide systems such as $Ag(CN)_2$, $Au(CN)_2$ and $Cu(CN)_2$ can be used as sensitizers whereas open-shell $d^8$ systems like $Ni(CN)_4$, $Pd(CN)_4$ and $Pt(CN)_4$ are not effective sensitizers as can be seen in FIG. 7.

Figure 7:
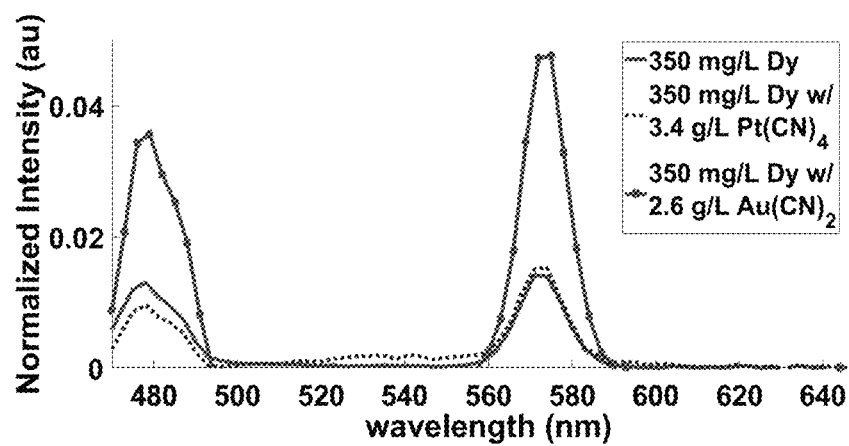
FIG. 7 illustrates luminescence intensity of 350 mg/L $Dy(NO_3)_3$ aqueous solutions with and without $Pt(CN)_4$ or $Au(CN)_2$ sensitizers.

FIG. 7: Luminescence intensity of 350 mg/L $Dy(NO_3)_3$ aqueous solutions with and without $Pt(CN)_4$ or $Au(CN)_2$ sensitizers. Results were collected using a Jobin Yvon Fluorolog 3 and xenon arc lamp exciting at 369 nm through a quartz cuvette.

Figure 8:
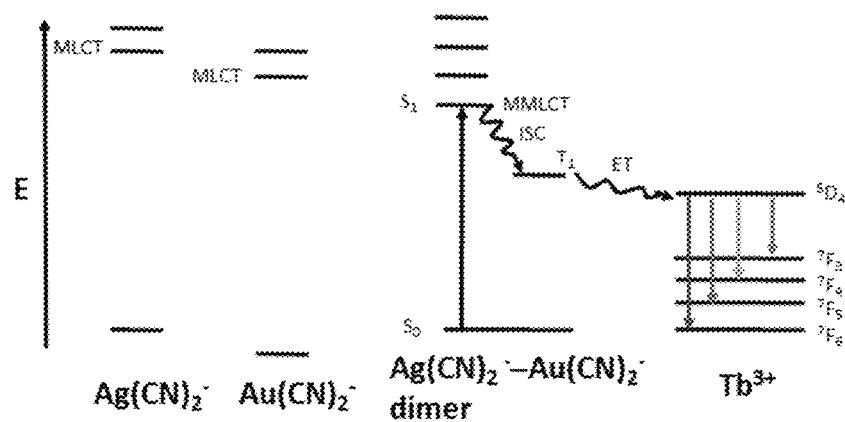
FIG. 8 illustrates an energy diagram of energy transfer from homometallic vs. heterobimetallic oligomers to $Tb^{3-}$.

Mixed metal systems such as $Au_xAg_{1-x}(CN)_2$ were also tested for the possibility of a metal-metal ligand charge transfer allowing for better energy transfer to the rare earth as pictured in FIG. 8, however, they did not provide lower limits of detection likely because the MMLCT signal was too weak in these cases. It may be optimized in the future, possibly by lowering the temperature or other parameters. FIG. 8: Energy diagram of energy transfer from homometallic vs. heterobimetallic oligomers to $Tb^{3+}$.

The limits of detection achieved to date using one or more embodiments of the compact device are not as low as the more expensive table-top systems including the Fluorolog 3 or an ICP based system, however, embodiments of this compact device may be carried into the field allowing for rapid detection of high-value ores or process streams for recovery. Significant opportunities also exist to further enhance the low limit of detection through optimization of the optical components as well as engineering of sensitizers. For example, one challenge stems purely from the availability of components such as high-powered LEDs in a wide range of bandwidths to optimize the excitation wavelengths that would allow further improvements while maintaining portability.

Additional embodiments may include using disposable probe tips so there is no need to clean the ends of bifurcated cable. These disposable tips could be stripped and dip-coated with a silica sol-gel impregnated with sensitizers immobilized within. The rare earth elements could migrate through the semi-porous sol-gel and complex with the sensitizers. This would negate the need for measuring out sensitizers and dissolving them in solution. It was also contemplated to reduce the amount of sensitizer needed, since the sensitizers would be concentrated near the probe where they are of the most use for complexing with rare earth elements and amplifying their luminescent signal. Sorbents may also be immobilized in the sol-gel to better hold the REEs close to the probe. Also, plasmonic nanoparticles may be used alone or in conjunction with the other sensitizers to enhance the rare earth signal. Software may also be written to automatically identify the sample identity and concentration with a single click based on libraries of data taken on similar types of samples.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted. It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

What is claimed is:

1. An apparatus for detection of rare earth elements comprising:
   A light source providing one or more luminescent signals;
   a shortpass filter that reduces low energy emissions from the light source, the shortpass filter in optical communication with at least the light source;
   a fiber bifurcated cable in optical communication with at least the shortpass filter and a sample, the fiber bifurcated cable providing and receiving one or more luminescent signals;
   a probe tip in optical communication with the fiber bifurcated cable and the sample, the probe tip functionalized with a coating that enhances a detection limit for rare earth elements;
   a longpass filter in optical communication with the fiber bifurcated cable receiving the one or more luminescent signals; and
   a longpass filter is in optical communication with a spectrometer which analyzes the one or more luminescent signals.

2. The apparatus of claim 1 the light source is an LED light source having a wavelength of about 400 nm or shorter.

3. The apparatus of claim 2 wherein the LED light source has a wavelength of about 365 nm and an output between about 1.15 W and about 1.4 W.

4. The apparatus of claim 1 further comprising a focusing lens in optical communication with the light source and the shortpass filter.

5. The apparatus of claim 1 wherein the shortpass filter comprises a shortpass filter that permits at least 95% of the signal intensity from the light source.

6. The apparatus of claim 5 wherein the shortpass filter comprises a 390 nm shortpass filter.

7. The apparatus of claim 1 further comprising a first aspheric lens in optical communication with the fiber bifurcated cable and the longpass filter and a second apheric lens in optical communication with the longpass filter and the spectrometer.

8. The apparatus of claim 1 wherein the longpass filter comprises a 458 nm longpass filter or smaller wavelength eliminating low-energy signals from the light source to near zero.

9. The apparatus of claim 1 further comprising a sensitizer added to a solution phase to enhance a detection limit of rare earth elements.

10. An apparatus for detection of rare earth elements comprising:
- an LED light source connected to a power source providing UV light;
- a shortpass filter in optical communication with the LED light source, the shortpass filter reducing low energy emissions from the LED light source;
- a fiber bifurcated cable in optical communication with the shortpass filter;
- a probe tip in optical communication with the fiber bifurcated cable and a sample, where the probe tip is functionalized with a coating that enhances the detection limit for rare earth elements which could be comprised of an immobilized sensitizer in a silica-based sol-gel, a sorbent materials for rare earth ions, plasmonic nanoparticles, or another type of functional layer;
- a first aspheric lens in optical communication with at least the fiber bifurcated cable;
- a longpass filter in optical communication with the first aspheric lens;
- a second aspheric lens in optical communication with the longpass filter; and
- a second aspheric lens in optical communication with a spectrometer which analyzes the one or more luminescent signals.

11. The apparatus of claim 10 wherein the LED light source has a wavelength of about 365 nm and an output between about 1.15 W and about 1.4 W.

12. The apparatus of claim 10 further comprising a focusing lens in optical communication with the light source and the shortpass filter.

13. The apparatus of claim 10 wherein the shortpass filter comprises a shortpass filter that permits at least 95% of the signal intensity from the light source.

14. The apparatus of claim 13 wherein the shortpass filter comprises a 390 nm shortpass filter.

15. The apparatus of claim 10 wherein the longpass filter comprises a 458 nm longpass filter or smaller wavelength eliminating low-energy signals from the light source to near zero.

16. The apparatus of claim 10 further comprising a sensitizer added to a solution phase to enhance a detection limit of rare earth elements.

17. An apparatus for detection of rare earth elements comprising:
- a light source providing one or more luminescent signals;
- a shortpass filter that reduces low energy emissions from the light source, the shortpass filter in optical communication with at least the light source;
- a fiber bifurcated cable in optical communication with at least the shortpass filter and a sample, the fiber bifurcated cable providing and receiving one or more luminescent signals;
- a probe tip in optical communication with the fiber bifurcated cable and the sample, the probe tip functionalized with a coating that enhances a detection limit for rare earth elements, wherein the coating is selected from the group comprising an immobilized sensitizer, a silica-based sol-gel, a sorbent material for rare earth ions, plasmonic nanoparticles, or another type of functional layer;
- a longpass filter in optical communication with the fiber bifurcated cable receiving the one or more luminescent signals; and
- a longpass filter is in optical communication with a spectrometer which analyzes the one or more luminescent signals.

18. The apparatus of claim 17 wherein the light source is an LED light source having a wavelength of about 365 nm and an output between about 1.15 W and about 1.4 W.

19. The apparatus of claim 18 further comprising a focusing lens in optical communication with the light source and the shortpass filter.

20. The apparatus of claim 17 wherein the shortpass filter comprises a 390 nm shortpass filter.

* * * * *